United States Patent Office 3,152,469
Patented Oct. 13, 1964

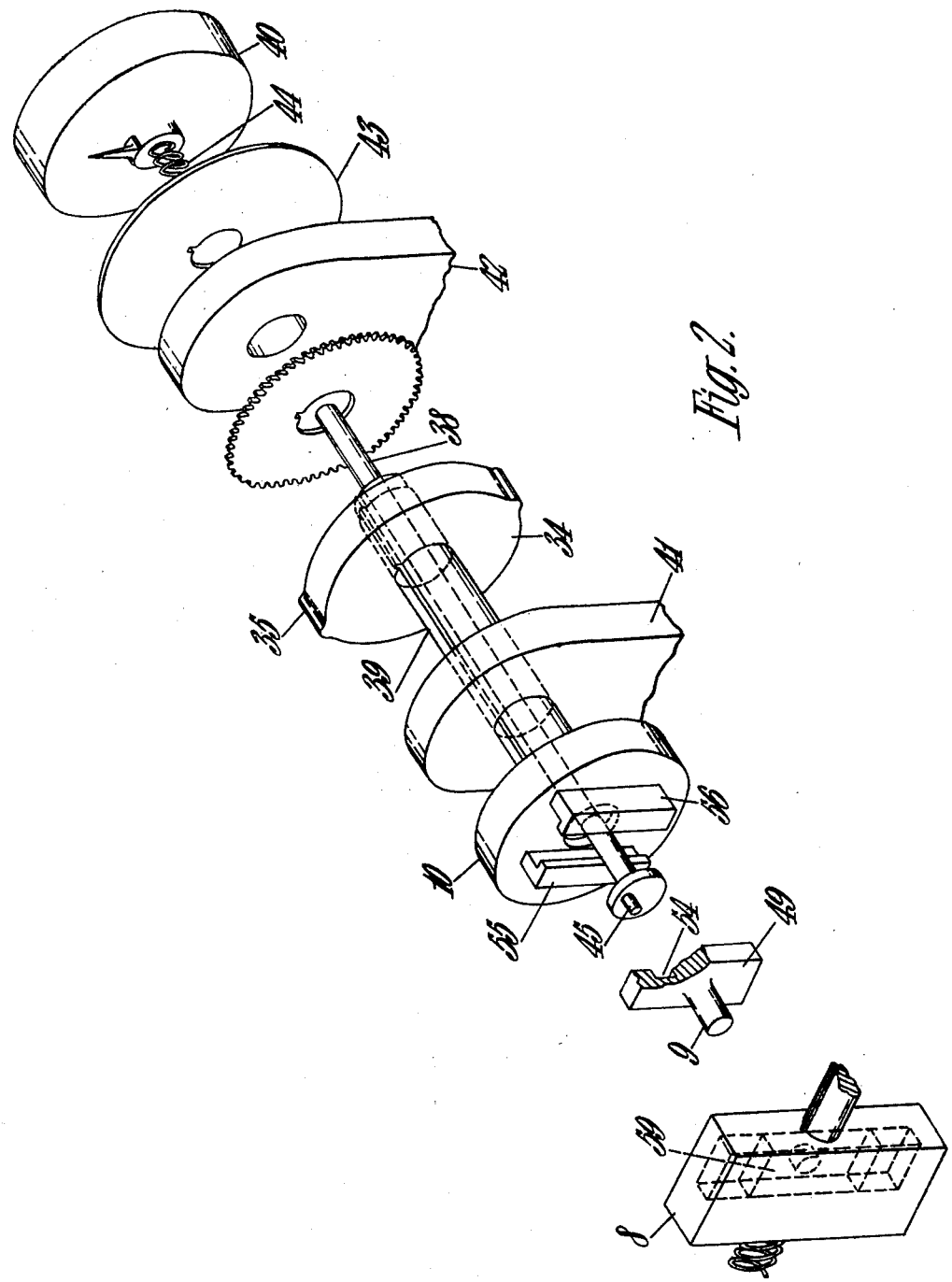

3,152,469
APPARATUS FOR TESTING RUBBER
Arthur Rowlatt More, Croydon, and Arthur Robert Payne, Shrewsbury, England, assignors of one-half to The Research Association of British Rubber Manufacturers, near Shrewsbury, England, and one-half to H. W. Wallace & Company Limited, Croydon, England
Filed Dec. 21, 1959, Ser. No. 861,121
Claims priority, application Great Britain, Dec. 23, 1958, 41,577/58
11 Claims. (Cl. 73—15.6)

This invention relates to apparatus for testing natural or synthetic rubber compound and more particularly for ascertaining the times required at any given temperatures for obtaining given states of vulcanization including the insipient or premature vulcanization known as "scorch." More commonly it is the state of vulcanization giving the most desirable combination of physical properties which it is required to know and which the technologist refers to as the "optimum" vulcanization.

The normal procedure for finding the time required for optimum vulcanization is to vulcanize trial samples in the form of test pieces for different periods of time at a given temperature, and then to subject these samples to tensile and other tests so that their physical properties can be evaluated. In this way one can find the optimum vulcanizing time for a particular rubber compound, but it involves employing a reliable and skilled type of labor to carry out and evaluate the tests. It will be appreciated that factory production cannot commence until the necessary particulars are received about vulcanization, and therefore, there is an unavoidable delay during the production cycle while these lengthy tests are being carried out.

The object of this invention is to provide test apparatus to determine rapidly the time required for change of stiffness of a material and in particular the given vulcanization state of a rubber compound. The time for optimum vulcanization may be ascertained during actual production provided that the trial vulcanization by means of the apparatus constructed in accordance with the invention is started at the same time as the vulcanization of the first production article or articles.

The invention consists in apparatus for ascertaining the change of stiffness of materials while undergoing a physical or chemical change comprising a stationary support for a sample of the material defined by a pair of spaced parallel jaw-like members, means for attachment to the sample at a point spaced from said support defined by a spade-like member and mounted for movement in a plane parallel to the jaw-like members, means for generating a reciprocating motion of a constant amplitude, resilient means connected at one end to said generating means and at the other end to said attachment means so that the reciprocating motion from said generating means is applied to said sample whereby the amplitude of reciprocation of the attachment means may change as the stiffness of the sample changes, and motion amplifying and indicating means operatively connected with said attachment means for indicating changes of amplitude of reciprocation of the latter.

The invention further consists in apparatus for testing a rubber compound and thereby ascertaining the time required for its optimum vulcanization, comprising a stationary support for a sample of the rubber to be tested defined by a pair of spaced parallel heating platens, means for attachment to the sample at a point spaced from said support defined by a spade-like member positioned between said platens and mounted for movement in a plane parallel to the platens, means for generating a reciprocating motion of constant amplitude, resilient means connected to one end of said generating means and at the other end to said attachment means so that the reciprocating motion from said generating means is applied to said sample whereby the amplitude of reciprocation of the attachment means may decrease as the sample becomes stiffer as vulcanization proceeds, and motion amplifying and indicating means operatively connected with said attachment means for indicating changes of amplitude of reciprocation of the latter.

The following description is directed in particular to apparatus for testing a rubber compound and ascertaining the time required for its optimum vulcanization, but it is to be understood that the apparatus described and illustrated may be modified in such a manner as to make it suitable for testing other materials which cross-link by chemical means or to apply other treatments or variation of conditions of rubber or plastics or thermo-setting materials whereby the stiffness changes and therefore the following description and claims are to be construed accordingly.

The drawings accompanying the complete specification show, by way of example only, one mode of carrying the invention into effect in which:

FIGURE 1 is a general perspective view of the apparatus, while

FIGURE 2 is an exploded perspective view of the driving assembly.

Figure 1:
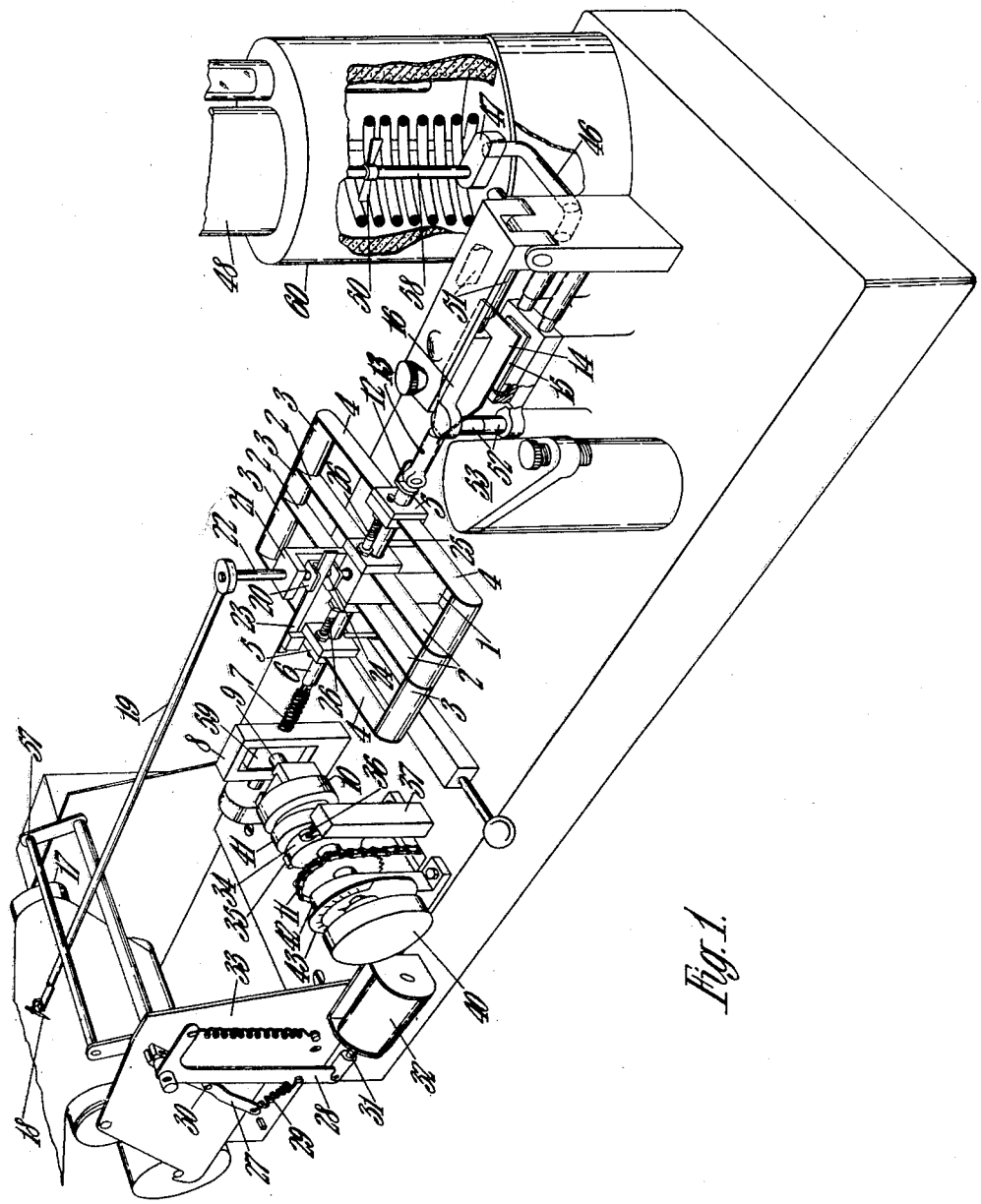

The reciprocating parts are supported upon a pillar 1 from the base plate of the apparatus. This pillar carries two springs 2 which support the rod like members 3 which in their turn support the springs 4 to which are attached the blocks 5 which are interconnected by the rod 25 passing through a clearance bore in the pillar 1 so that the rod may move with reciprocating motion. This reciprocating movement is imparted by the link 6 and spring 7 attached to the slipper block 8 which is caused to oscillate by an eccentric pin 9 on the disc 10 rotated by the sprocket wheel and chain 11 by an electric motor, not shown. A bracket 12 is mounted upon the block 5 and carries a hingeable arm 13 the outer end of which is provided with a plate 14, with or without perforations, the purpose of which is to form an attachment to the sample, by being embedded therein in sandwich manner. The sample is placed upon the heated platen 15 and a further heated platen 16 lowered on the top thereof.

The recording drum 17 is provided with a stylus 18 on an arm 19 which is moved by way of the motion amplifying means, comprising a U-shaped bell-crank 20 mounted for rotation in the bracket 21 upon the axle 22. Angular movement is imparted to the arm 19 by means of a groove in a spring strip 23, attached to the block 5, engaging on the knife-edge 24 on the U-shaped bell-crank 20 which is spaced a short distance, say 1 mm., from the axis of the axle 22. Quite small reciprocation of the arm 13 results in considerable movement of the extremity of the arm 19.

The screws 26 are provided to act as stops to prevent excessive movement of the rod 25 which might damage the apparatus.

The symmetrical arrangement of the springs 2 and 4 about the axis of the rod 25 ensures that the latter moves truly longitudinally and that no sideways movement is imparted to the spring strip 23.

The spring 7 is always in tension and thus ensures that the slipper block 8 is always in contact with the slipper 59 in which the crank pin revolves, thereby avoiding backlash. The slipper block 8 is supported for movement in a straight and horizontal line by a rod in a horizontal bore in the adjacent pillar. The slipper and slipper block system is employed rather than a crank and connecting rod as the former imparts sinusoidal movement thereby ensuring a symmetrical trace on the recording paper.

In order to prevent the friction between the stylus 18 and the paper on the drum 17 from hindering movement of the arm 19, the stylus is normally positioned clear of the paper and is pressed down to make a mark only at the extremities of the movement of the slipper block system, and for this purpose there is provided the bar 57 pivoted on an arm at each end of the frame supporting the drum, and which is depressed by means of the arm 27 resiliently urged against the arm 28 by the spring 29 but restrained by way of the pin 30. The arm 28 is connected to the armature 31 of the solenoid 32, the armature moving into the solenoid by magnetic attraction and being urged outwardly by the spring 33. The disc 34 is provided with two small projections 35 on diametrically opposite sides which engage upon the wheel 36 on the operating arm of the switch 37 and so positioned that the circuit is closed to energise the solenoid when the slipper block system is in its two extreme positions.

The driving assembly shown in exploded perspective in FIGURE 2 provides for adjustability of the extent of osciillation of the slipper block 8 and comprises an inner rod 38 rotatable in a bore in the axle 39 by means of the knob 40. The axle rotates in bearings in the support pillars 41 and 42 while the dial 43 is fastened to the axle and therefore rotates with it. The spring 44 is provided to ensure that the rod 38 only rotates in the bore in the axle when the knob is adjusted.

One end of the rod 38 carries an eccentric pin 45 which engages in a slot 54 in the block 49 which latter is slidable transversely of the axis of the axle 39 in the slides 55 and 56 fixed to the disc 10 on the axle. The amount by which the pin 45 is displaced from the axis of the axle is indicated by a pointer on the knob 40 and spaced markings on the dial 43 representing equal increments of throw of the driving assembly.

The pin 9 works in a bore in the slipper 59, as previously described. The cam disc 34 and the sprocket wheel are both fastened to the axle 39.

The platens 15 and 16 are heated by fluid from the heater 60 and circulated by way of the pipe 46 by means of the gear pump 47 first through one platen and then through the other. The pump 47 is driven by the electric motor 48 on the top of the heater 60 by way of the shaft 58 which carries blades 50 which assist in circulating the liquid in the heater. The pipes 51 are provided with flexible connectors so that the upper platen 16 may be hinged out of the way while the sample is being placed on the lower platen 15. The platens are spaced a fixed distance apart by means of the spacers 52 while they may be held firmly together by means of the clamp 53 which is swung over the top of the support member for the top platen.

The recording drum may conveniently be driven by a clockwork motor housed in the drum.

It will now be appreciated that as the sample cures or vulcanizes its shear modulus increases and it restrains the embedded plate from reciprocating to the amplitude characteristic of the beginning of the test, the spring 7 absorbing the difference in movement. It will also be appreciated that the apparatus applies to the rubber sandwich a shearing force and measures the strain imparted by this force to the sheared member of the sandwich. It is this combination of applying a force and measuring the in-going strain which makes possible the simple mechanical recording and which is the essence of the apparatus described in this invention.

It is to be understood that the apparatus can take many different forms and details for carrying the invention into effect may be varied without departing from the scope of the invention.

We claim:

1. Apparatus for ascertaining the change of stiffness of materials while undergoing a physical or chemical change at least at ambient temperature comprising a stationary support for a sample of the material defined by a pair of spaced parallel jaw-like members, means for attachment to the sample at a point spaced from said support defined by a spade-like member positioned between the jaw-like members and mounted for movement in a plane parallel to the jaw-like members, means for generating a reciprocating motion of a constant amplitude, resilient means connected at one end to said generating means and at the other end to said attachment means so that the reciprocating motion from said generating means is applied to said sample whereby the amplitude of reciprocation of the attachment means may change as the stiffness of the sample changes, and motion amplifying and indicating means operatively connected with said attachment means for indicating changes of amplitude of reciprocation of the latter.

2. Apparatus for testing a rubber compound and thereby ascertaining the time required for its optimum vulcanization, comprising a stationary support for a sample of the rubber to be tested defined by a pair of spaced parallel heating platens, means for attachment to the sample at a point spaced from said support defined by a spade-like member positioned between the platens and mounted for movement in a plane parallel to the platens, means for generating a reciprocating motion of constant amplitude, resilient means connected at one end to said generating means and at the other end to said attachment means to said sample so that the reciprocating motion from said generating means is applied to said sample whereby the amplitude of reciprocation of the attachment means may decrease as the sample becomes stiffer as vulcanization proceeds, and motion amplifying and indicating means operatively connected with said attachment means for indicating changes of amplitude of reciprocation of the latter.

3. Apparatus for testing a rubber compound and thereby ascertaining the time required for its optimum vulcanization comprising a pair of spaced parallel heating platens forming a support for a sample of the rubber to be tested, plate means positioned between the platens for attachment to the sample and mounted for movement in a plane parallel to said platens, a power driven crank pin, a slipper block, a slipper supported in the slipper block and operable by the crank pin to apply to said block a reciprocating motion of constant amplitude, rod means operatively connected to said plate means, spring means connected at one end to the slipper block and at the other end to said rod means, the arrangement being such that the reciprocating motion of the slipper block is applied to said sample in a manner whereby the amplitude of reciprocation of the plate means may decrease as the sample becomes stiffer as vulcanization proceeds, and motion amplifying and indicating means operatively connected with the rod means for indicating changes of amplitude of reciprocation of the plate means.

4. Apparatus according to claim 3, including a base, said rod means being supported for longitudinal reciprocation in a leaf spring system supported at one end rigidly upon the base and freely movable at the other end, and the plate means being hingeably connected to one end of the rod means.

5. Apparatus as claimed in claim 4, wherein the leaf spring system comprises four leaf springs positioned parallel to one another with their broader surfaces facing each other and spaced apart to form a rectangular frame, rod like spacers being provided between and joining the ends of said leaf springs, and the two outer springs being connected at their centers to the reciprocating rod while the two inner springs are connected at their centers to the base.

6. Apparatus as claimed in claim 5, wherein the rod means passes through the centers of the leaf springs, parallel to and mid-way between the rod like spacers and in the same plane as said spacers.

7. Apparatus according to claim 3, wherein the amplitude of reciprocation of the slipper block is manually adjustable by means comprising a power driven axle, a disc rotatable wtih said axle, an adjustable block carrying the crank pin and slidably mounted on said disc for adjustment transversely of the axle axis, a pin operatively connected to said block and carried eccentrically at one end of a rod passing through said axle, and means at the other end of the rod for manually rotating the latter and thereby adjusting the throw of the crank pin and thus the amplitude of reciprocation of the slipper block.

8. Apparatus for testing a rubber compound and thereby ascertaining the time required for its optimum vulcanization, comprising a stationary support defined by a pair of spaced parallel heating platens, means for attachment to the sample at a point spaced from the support defined by a spade-like member positioned between the platens and mounted for movement in a plane parallel to the platens, means for generating a reciprocating motion of constant amplitude, resilient means connected at one end to said generating means and at the other end to said attachment means so that the reciprocating motion from said generating means is applied by said sample whereby the amplitude of reciprocation of the attachment means may decrease as the sample becomes stiffer as vulcanization proceeds, and motion amplifying and indicating means operatively connected with said attachment means for indicating changes of amplitude of reciprocation of the latter, said motion amplifying and indicating means comprising a lever mechanism having a U-shaped member pivotable on a fixed axle about an axis passing through the limbs of the U-shaped member and at right angles thereto, a knife-edge bearing parallel to and adjacent said axis upon which rests a groove in a plate movable longitudinally with the attachment means, and an indicating and recording lever attached to said axle.

9. Apparatus as claimed in claim 8, in which the apparatus is provided with a recording drum and a stylus attached to the recording lever.

10. Apparatus as claimed in claim 9, in which the recording lever is normally kept raised and is lowered only at the two ends of the movement of the stylus across the recording drum.

11. Apparatus as claimed in claim 10, including a bar positioned parallel to the drum for lowering the recording lever, an electric solenoid operatively connected to said bar, a switch controlling energization of said solenoid for lowering said bar and thus the recording lever, and a cam operating said switch and being rotated by the means for generating a reciprocating motion, said switch energizing said solenoid to lower said bar and recording lever at the two extremities of the reciprocating motion.

References Cited in the file of this patent

UNITED STATES PATENTS

| | | |
|---|---|---|
| 1,988,597 | Karrer | Jan. 22, 1935 |
| 2,037,529 | Mooney | Apr. 14, 1936 |
| 2,222,470 | Barnes | Nov. 19, 1940 |
| 2,350,722 | Buckingham | June 6, 1944 |
| 2,377,590 | Talalay | June 5, 1945 |
| 2,479,984 | Stock | Aug. 23, 1949 |
| 2,669,119 | Dodge | Feb. 16, 1954 |
| 2,685,195 | Streblow | Aug. 3, 1954 |
| 2,713,260 | Prettyman et al. | July 19, 1955 |
| 2,774,239 | Fitzgerald | Dec. 18, 1956 |
| 2,904,994 | Claxton | Sept. 22, 1959 |
| 3,039,297 | Peter et al. | June 19, 1962 |